(12) United States Patent
Wieprecht

(10) Patent No.: US 11,539,259 B2
(45) Date of Patent: Dec. 27, 2022

(54) CONTACT DEVICE FOR A STATOR, STATOR AND ELECTRIC MACHINE

(71) Applicant: WIELAND-WERKE AG, Ulm (DE)

(72) Inventor: Nico Wieprecht, Isny (DE)

(73) Assignee: WIELAND-WERKE AG, Ulm (DE)

( * ) Notice: Subject to any disclaimer, the term of this patent is extended or adjusted under 35 U.S.C. 154(b) by 143 days.

(21) Appl. No.: 17/147,993

(22) Filed: Jan. 13, 2021

(65) Prior Publication Data

US 2021/0226503 A1   Jul. 22, 2021

(30) Foreign Application Priority Data

Jan. 16, 2020   (DE) .......................... 102020000232.3

(51) Int. Cl.
  *H02K 3/52*   (2006.01)
(52) U.S. Cl.
  CPC ......... *H02K 3/522* (2013.01); *H02K 2203/09* (2013.01)
(58) Field of Classification Search
  CPC .......................... H02K 3/522; H02K 2203/09
  See application file for complete search history.

(56) References Cited

U.S. PATENT DOCUMENTS

| 6,930,434 B1 * | 8/2005 | Spencer ................. H02K 3/527 310/270 |
| 8,384,257 B2 | 2/2013 | Kinugawa et al. |

(Continued)

FOREIGN PATENT DOCUMENTS

| CN | 208806679 U | 4/2019 |
| DE | 112008001262 T5 | 4/2010 |

(Continued)

OTHER PUBLICATIONS

Office Action of German Patent Office issued in corresponding German Application No. 10 2020 000 232.3 dated Jul. 14, 2020 (5 pages).

(Continued)

*Primary Examiner* — Robert W Horn
(74) *Attorney, Agent, or Firm* — Flynn Thiel, P.C.

(57) ABSTRACT

The invention relates to a contact device (1) for a stator (2) of an electric machine, wherein the contact device (1) has a contact carrier (4) made from an electrically insulating material, an upper side, which can be positioned to face away from the stator (2), and, at least on the upper side which can be positioned to face away from the stator (2), electrically conductive connection conductors (41) for contacting a plurality of coils (3), arranged over the circumference of the stator (2), via coil conductors (31). The contact device (1) furthermore has feedthrough openings (5), through which the coil conductors (31) of the coils (3) can be guided such that at least one coil conductor (31) can be connected to a connection conductor (41). The contact carrier (4) moreover has fixing devices (6) at the feedthrough openings (5), which fixing devices are designed in such a way that at least one coil conductor (31) touches a connection conductor (41) at a contact surface (7) and the coil conductor (31), at this contact surface (7), applies a permanent force action to the connection conductor (41) via forces acting perpendicularly to the respective conductor axis, whereby mutually parallel-lying portions of the coil conductor (31) and the connection conductor (41) are pressed against each other at the common contact surface (7).

20 Claims, 3 Drawing Sheets

(56) References Cited

U.S. PATENT DOCUMENTS

| | | | | |
|---|---|---|---|---|
| 9,293,960 | B2* | 3/2016 | Tomita | H02K 3/522 |
| 9,325,214 | B2* | 4/2016 | Tomita | H02K 3/522 |
| 9,450,464 | B2* | 9/2016 | Tomita | H02K 3/522 |
| 9,484,782 | B2* | 11/2016 | Arai | H02K 3/522 |
| 9,893,586 | B2* | 2/2018 | Tomizawa | H02K 5/10 |
| 10,097,057 | B2* | 10/2018 | Kessler | H02K 3/46 |
| 10,910,924 | B2* | 2/2021 | Kodama | H02K 3/50 |
| 11,108,295 | B2* | 8/2021 | Finger-Albert | H02K 7/006 |
| 11,329,533 | B2* | 5/2022 | Seo | H02K 3/521 |
| 2014/0183993 | A1* | 7/2014 | Takasaki | H02K 15/0062 |
| | | | | 310/71 |
| 2018/0316239 | A1* | 11/2018 | Ogawa | H02K 3/522 |
| 2019/0305656 | A1 | 10/2019 | Kobayashi et al. | |
| 2021/0226503 | A1* | 7/2021 | Wieprecht | H02K 3/522 |
| 2022/0014068 | A1* | 1/2022 | Seo | H02K 1/146 |

FOREIGN PATENT DOCUMENTS

| | | |
|---|---|---|
| DE | 202010017081 U1 | 4/2011 |
| DE | 102016224526 A1 | 6/2018 |
| EP | 2606558 B1 | 6/2013 |
| JP | 07264803 A | 10/1995 |
| KR | 1020120068115 A | 6/2012 |

OTHER PUBLICATIONS

European Search Report issued in corresponding European Application No. 20 000 479.4, with English translation of category of cited documents dated Jun. 4, 2021 (7 pages).

* cited by examiner

CONTACT DEVICE FOR A STATOR, STATOR AND ELECTRIC MACHINE

CROSS-REFERENCE TO RELATED APPLICATIONS

This claims priority from German Application No. 10 2020 000 232.3, filed Jan. 16, 2020, the disclosure of which is hereby incorporated by reference in its entirety.

TECHNICAL FIELD

The invention relates to a contact device for a stator of an electric machine, a stator and an electric machine.

BACKGROUND AND SUMMARY

Electric motors have a stator with three phases, for example as a three-phase machine, and therefore at least three phase conductors or phase windings, to which an electric current is applied with a phase shift in each case to generate a rotating magnetic field in which a rotor or armature, conventionally provided with permanent magnets, rotates. The phase ends of the phase windings are guided to the motor electronics to control the electric motor via phase connections. The coils are connected to each another in a suitable manner via the coil ends of the phase windings. The manner of interconnecting the coil ends is determined by the winding pattern of the rotating field winding.

Contact devices, which are seated on the end face of the stator, are conventionally used for guiding and interconnecting the coil ends. Such a contact device has, for example, a routing ring and a connection ring, seatable thereon, between which the coil ends to be interconnected lie.

Designing the contact device as a modular assembly, for example, so that a different contacting device is seated on the stator, depending on the application and the desired interconnection, has been considered for suitably and flexibly connecting different winding patterns in practice. In particular, in applications which require the rotating field winding to be connected with single or multiple redundancy, such a modular contacting device has a high spatial requirement.

EP 2 606 558 A1 discloses a contact device in a stator of an electric machine, which has a ring-shaped contact carrier made from an electrically insulating material and electrical conducting paths for contacting the coils of the stator. The conducting paths are held on the contact carrier via shaped fastening elements.

A stator of an electric machine with a stator lamination stack is furthermore known from DE 10 2016 224 526 A1. An associated contact device comprises a routing element seated on the end face of the stator lamination stack and a connection element for connecting the coil ends to phase connections at a stator end face. The coil ends project perpendicularly through feedthrough openings in the routing element and are each guided in a radially angled manner along a guide groove of the routing element. At a contact point of the guide groove, these coil ends are contacted and fixed axially by means of a contact element coupled to the connection element in an electrically conductive manner. The guide grooves each have a narrow point in the axial direction, which secures the coil end guided in each case in the guide groove against sliding out axially.

The invention is based on the object of developing a contact device for a stator of an electric machine.

The invention includes a contact device for a stator of an electric machine, wherein the contact device has a contact carrier made from an electrically insulating material, an upper side, which can be positioned to face away from the stator, and, at least on the upper side facing away from the stator, electrically conductive connection conductors for contacting a plurality of coils, arranged over the circumference of the stator, via coil conductors. The contact device furthermore has feedthrough openings, through which the coil conductors of the coils can be guided such that at least one coil conductor can be connected to a connection conductor. In particular, a respective coil conductor can be connected to a respective connection conductor. Moreover, the contact carrier has fixing devices at the feedthrough openings, which fixing devices are designed in such a way that at least one coil conductor touches a connection conductor at a contact surface and the coil conductor, at this contact surface, applies a permanent force action to the connection conductor via forces acting perpendicularly to the respective conductor axis. It is thus possible that mutually parallel-lying portions of the coil conductor and the connection conductor, in particular mutually parallel-lying ends of the coil conductors and the connection conductors, are pressed against each other at the common contact surface.

The contact device according to the invention can preferably be used in a stator of an electric machine such as a generator or an electric motor. Areas of application are, for example, motors in the automotive field or in applications in general machine construction and in drive technology. For example, in servomotors, drive motors or auxiliary units in vehicles.

In this case, the invention starts with the consideration that contact carriers made from an insulating material can be seated on the end face of the stator and connected to the stator housing. The contact carrier therefore serves, on the one hand, for fastening the contact device to the stator and, on the other, as a carrier of the conducting paths of the connection conductors. Owing to the way in which the contact carrier is designed, different conducting paths made from an electrically insulating material are electrically insulated from each other on the contact carrier. Although the contact carriers are often already constructed in a very complex manner, a single ring-shaped contact carrier on which the conducting paths of the connection conductors are arranged is, in principle, also sufficient.

Via the contact device, the coils in the stator can be electrically connected via coil conductors. The contact device comprises a usually ring-shaped contact carrier made from electrically insulating material and electrically conductive conducting paths as connection conductors for contacting the winding wire of the coils. The conducting paths, winding wires of the coils and the coil conductors can have a circular, oval rectangular or even square cross-section perpendicularly to their conductor axis.

To connect the coil conductors of the coils to the connection conductors for electrical contacting, it is advantageous that these have a similar type of rectangular or even square cross-section at the connecting point. The coil conductors and the connection conductors therefore touch each other at a flat and maximized contact surface.

In the region of this contact surface, the coil conductors are connected to the connection conductors in an electrically conductive and preferably material fitting manner. Suitable material fitting connections of the coil conductors and connection conductors lying against each other at respective ends are, for example, welded connections or soldered connections.

The contact carrier made from electrically insulating material, which is preferably designed in a ring shape, serves primarily as a positioning element when routing and connecting the conductor ends. To this end, the coil conductors are pushed through the feedthrough openings. The feedthrough openings have fixing devices, which retain the connection conductors at least by means of friction fit and/or material fit. In other words: the fixing devices are elastically deformable narrow passage points which are arranged in the feedthrough openings. The elastic behavior of the narrow point results in the retention when a coil conductor is contacted by a connection conductor of the contact device, for example by means of a plug-in connection or with material fit by means of a welded or soldered connection. In the case of welded or soldered connections, the retention of the coil conductors results in the cable ends already being fixed in position before the welding or soldering process, whereby the respective coil conductors and the respective connection conductors are positioned precisely with respect to each other to produce a joining connection.

The coil conductors apply a permanent force action to the connection conductors at the contact surface and can already produce secure electrical connections, possibly without further holding means. To generate the force action, the contact carriers are equipped with fixing devices at the feedthrough openings, which enables specific positioning of both conductor ends with respect to each other. The mutually parallel-lying conductor portions, in particular conductor ends, are thus pressed against each other at the common contact surface by forces acting perpendicularly to the respective conductor axis. This force action is present in particular during the joining procedure to produce good electrical contact and is advantageously also configured such that it continues to be sustained after the connection of the conductor ends.

A particular advantage consists in that a reliable and sustained electrical contact, which is not under strain from tensile stresses, is already present solely as a result of coil conductors and connection conductors being pressed against one another.

In a preferred configuration of the invention, the contact carrier can be designed with fixing devices at the feedthrough openings in such a way that these fixing devices arrest the coil conductors with respect to an axial movement, at least in one direction. For assembly purposes, the coil conductors of the coils are pushed through the feedthrough openings. The fixing devices are preferably designed such that the coil conductors are retained, at least contrary to the insertion direction, by means of friction fit or material fit. The insertion direction is the direction starting from the underside of the contact carrier, facing the coils, to the upper side on which the connection conductors are located. In this case, elastically deformable narrow passage points are created as a fixing device, which reliably counteract a reverse movement of the respective conductor end. The elastic behavior of the narrow point already results in the fixing action before a coil conductor is connected to a connection conductor of the contact device, for example by means of a plug-in connection or with material fit by means of a welded or soldered connection.

The fixing device can advantageously be formed by holding lugs. A plurality of elastic and/or plastically deformable holding lugs therefore form a narrow point whereof the opening width is smaller than the diameter of the coil conductors. These narrow the cross-section in such a way that the fixing device fixes the respective conductor ends in position in the manner of a gripping mechanism. As a result of an elastic or plastically deformable material, the opening width is widened only as a conductor end passes through, and a holding force which is perpendicular to the axial direction of the conductor and/or at the same time an axial holding force is thus generated. Suitable materials are plastic materials with correspondingly elastic or plastic properties. In particular, the holding lugs can also be made from the same material as the contact carrier.

In principle, it is also advantageous that a plurality of holding lugs can be arranged in at least one feedthrough opening. In this case, the holding lugs can be arranged in a passage plane and/or they can also be arranged staggered and/or offset in the axial direction of the passage opening through the contact carrier. In terms of their overall effect, the holding lugs are arranged such that they ultimately apply a permanent force action of the coil conductors to the connection conductors at the common contact surface. In their entirety, the holding lugs can also prevent a reverse movement of the respective conductor end contrary to the insertion direction. In the case of a square or rectangular conductor cross-section, it is advantageous to start with four holding lugs on the four conductor surfaces.

A force fit caused by static friction is conventionally formed between the fixing device and the conductor portion passing through the feedthrough opening. However, alternative fixing mechanisms, alone or in combination with each other, are possible.

Therefore, in an advantageous embodiment of the invention, the holding lugs form a form-fitting connection with the coil conductor. To this end, the conductor portion passing through the feedthrough opening can have, on its surface, a suitable roughness or alternative structure which forms a form fit with the holding lugs in each case. Structurally advantageous are notches, recesses or teeth on the conductor surface of a coil conductor, in which the holding lugs can engage.

Alternatively or in combination, in a further advantageous embodiment of the invention, the holding lugs form a material-fitting connection with the coil conductor. To this end, thermal connecting procedures, for example welding or soldering, can be used. As a result of a targeted heat input during the production of the electrical contacting, enough heat can flow along the coil conductors to the fixing device so that same can be thermally melted or fused and therefore form a stable material fit.

In a further advantageous configuration of the invention, the fixing device can be arranged at the output-side end of the feedthrough opening in the insertion direction of the coil conductors. In this case, during the installation, the conductor end is firstly introduced into the feedthrough opening and is already guided at the output-side end in a manner stable enough for it to pass through the fixing device.

The feedthrough openings can advantageously taper conically in the insertion direction of the coil conductors. A conical form of the feedthrough opening results in a larger opening on the input side, into which a conductor end of a coil conductor can be easily inserted, wherein the conductor end is guided through the tapering conical extent to the output-side end during installation. In such feedthrough openings, it is advantageous to arrange the fixing device directly at the output-side end. The conductor end is thus introduced directly into the fixing device.

A further aspect of the invention includes a stator of an electric machine having a contact device according to the invention.

A further aspect of the invention includes an electric machine having a stator according to the invention. The above-mentioned stator having the contact unit according to the invention can be an independent module unit of an electric machine.

BRIEF DESCRIPTION OF THE DRAWINGS

Exemplary embodiments of the invention are explained in more detail with reference to the schematic drawings, in which.

Mutually corresponding parts are denoted by the same reference signs in all figures.

DETAILED DESCRIPTION

Figure 1:
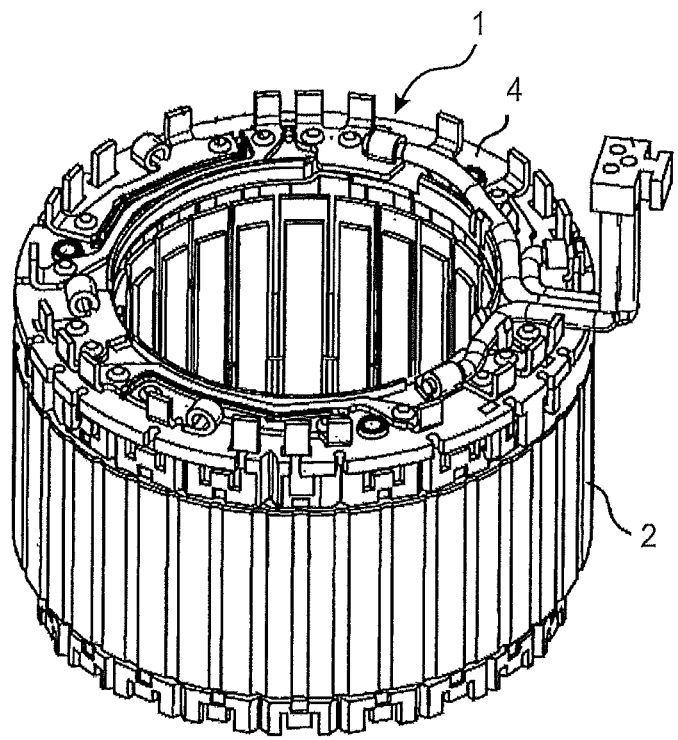
FIG. 1 shows a schematic view of a stator of an electric machine with a contact device seated on the end face.

In FIG. 1, a stator 2 with a contact device 1 seated on the end face is illustrated schematically. The connection contacts arranged on the upper side of a contact carrier 4 are assembled in a connector, which is to be connected to an electrical connection. This contact device 1 is illustrated as a partial detail in FIG. 2.

Figure 2:
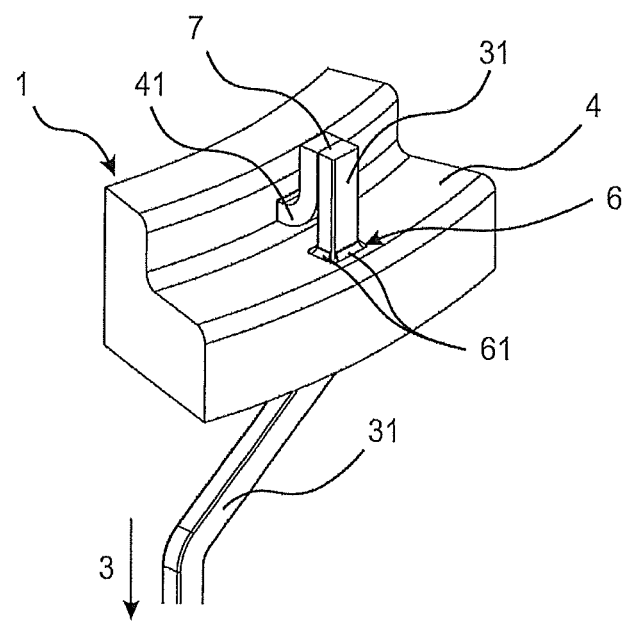
FIG. 2 shows a detailed view of a contact device in the region of a contact point of a coil conductor with a connection conductor.
Figure 4:
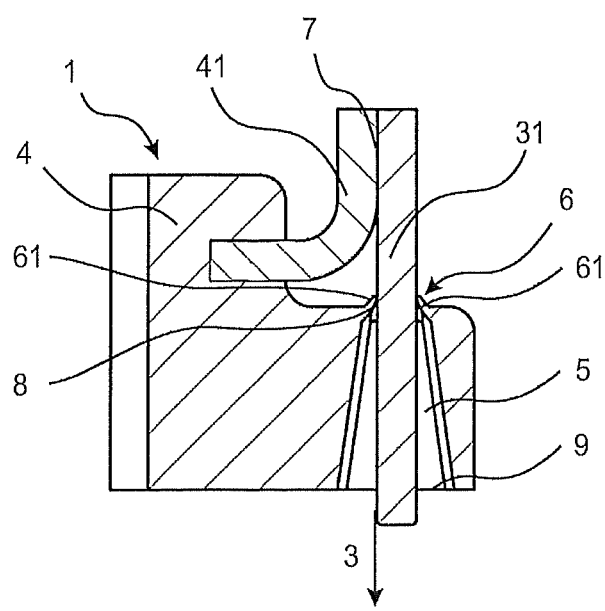
FIG. 4 shows a cross-section along the line A-A of FIG. 3.
Figure 5:
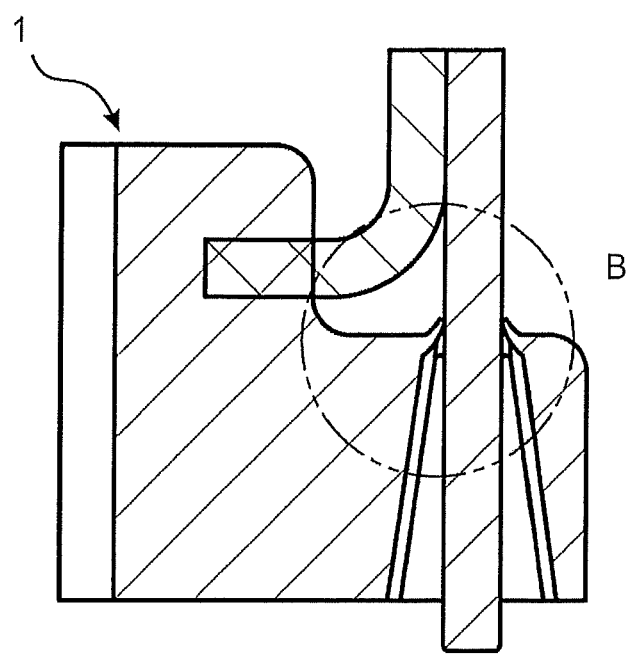
FIG. 5 shows a cross-section of a segment of a contact device.
Figure 6:
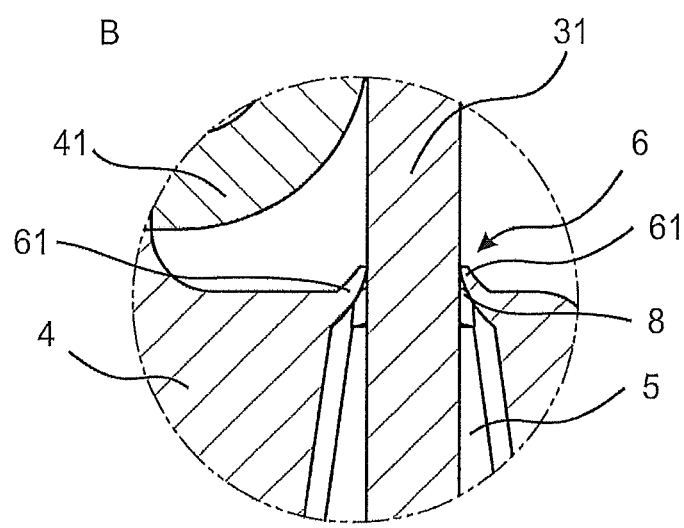
FIG. 6 shows a detailed view of the fixing device of FIG. 5.

FIG. 2 shows a schematic detailed view of a contact device 1 in the region of a contact point of a coil conductor 31 with a connection conductor 41. The coil is not illustrated in detail in FIG. 2, but is arranged in the direction of the arrow 3. The coil conductor 31 and the connection conductor 41 have a rectangular cross-section taken perpendicularly to their respective conductor axis. As a result of the rectangular cross-sections, the coil conductors 31 and the connection conductors 41 touch each other at a common contact surface 7. The end of the coil conductor 31 passes through a feedthrough opening 5 in the contact carrier 4 as shown in FIGS. 4-6. A fixing device 6 with holding lugs 61 is formed at the output-side end of the feedthrough opening 5. In this case, there are four elastically deformable holding lugs 61, which each lie against a surface of the rectangular coil conductor 31. These holding lugs 61 narrow the cross-section of the feedthrough opening 5 in such a way that the fixing device 6 acts on the respective coil conductors 31 in the manner of a gripping mechanism. In this case, the holding lugs 61 are also made from the same material as the contact carrier 4.

During the assembly of the coil conductors 31, these are pushed through the narrow point specified by the fixing device 6 and the holding lugs 61 are thereby pre-tensioned, as it were. This produces a force action by means of which the coil conductors 31 apply a permanent force action to the connection conductors 41 at the common contact surface 7. The coil conductors 31 and the connection conductors 41 are already connected in an electrically conductive manner as a result of the contact-pressure force and are moreover joined with material fit, for example via soldered or welded connections, at least in segments or over the entire common contact surface 7. The contact-pressure force between the coil conductor 31 and the connection conductor 41 can also serve to generate a reliable electrical contact in the case of plug-in contacts.

Figure 3:
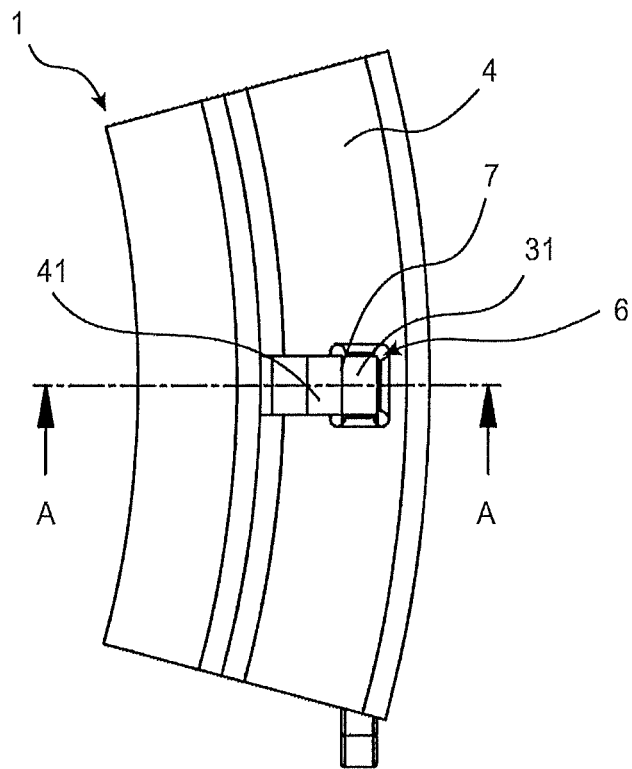
FIG. 3 shows a plan view of a segment of a contact device.

FIG. 3 shows a plan view of a segment of a contact device 1. A cross-section along the line A-A of FIG. 3 is illustrated in FIG. 4. The coil conductor 31 and the connection conductor 41 touch each other at the common contact surface 7. A joining connection can be realized at this contact surface 7. The end of the coil conductor 31 passes through a feedthrough opening 5 in the contact carrier 4. The feedthrough opening 5 has a larger opening width at the input-side end 9 than at the output-side end 8 and therefore tapers conically in the insertion direction of the coil conductor 31. As a result of a conical form of the feedthrough opening 5, the conductor end of a coil conductor 31 can be introduced through the feedthrough opening 5 more easily, wherein, during the installation, the conductor end is guided into the fixing device 6 through the tapering conical extent to the output-side end 8. The fixing device 6 is arranged with its holding lugs 61 directly at the output-side end 8. The conductor end of the respective coil conductor 31 is thus specifically guided through the fixing device 6 until it is positioned on the connection conductor 41.

FIG. 5 shows a cross-section of a segment of a contact device 1. A detailed view of the fixing device 6 of FIG. 5 is illustrated in FIG. 6. The holding lugs 61 of the fixing device 6, which are arranged at the output-side end 8, are elastically deformed in the insertion direction by the pushed-through coil conductor 31 and pre-tensioned. These upwardly bent holding lugs 61 counteract a reverse movement of the respective conductor end of the coil conductor 31. The elastic behavior of the narrow point already results in the fixing action before the associated connection conductor 41 is connected to the coil conductor 31 with material fit by means of a welded or soldered connection.

The invention claimed is:

1. A contact device for an electric machine stator having stator coils and coil conductors connected thereto, the contact device comprising a contact carrier comprising an electrically insulating material, an upper side positioned in use to face away from the stator, electrically conductive connection conductors disposed at least on the upper side of the contact device, feedthrough openings each having an output-side end opening at the upper side of the contact device, a fixing device disposed at each of the feedthrough openings, each fixing device including at least one elastic holding lug disposed to form a narrow point at the output-side end of the respective feedthrough opening to provide the feedthrough opening with a cross-section at the narrow point thereof having a dimension less than a dimension of a cross-section of at least one other portion of the feedthrough opening, the cross-sections of each feedthrough opening being taken in a direction substantially perpendicular to an axis of the respective feedthrough opening, the at least one elastic holding lug comprising a pre-tensioned configuration when a coil conductor of the stator is inserted through the narrow point of the respective feedthrough opening, the pre-tensioned configuration of the at least one elastic holding lug causing the inserted coil conductor to apply a permanent force action to an adjacent one of the connection conductors in a direction perpendicular to an axis of the inserted coil conductor, whereby mutually parallel-lying respective portions of the inserted coil conductor and the adjacent one of the connection conductors are pressed against one another at a common contact surface.

2. The contact device according to claim 1, wherein the fixing devices are configured to arrest the respective inserted coil conductors with respect to an axial movement relative to the contact carrier, in at least one axial direction.

3. The contact device according to claim 1, wherein the at least one elastic holding lug includes a plurality of elastic holding lugs arranged in each of the respective feedthrough openings.

4. The contact device according to claim 1, wherein the elastic holding lugs in each of the respective feedthrough openings form a form-fitting connection with the respective inserted coil conductor.

5. The contact device according to claim 3, wherein the elastic holding lugs in each of the respective feedthrough openings form a material-fitting connection with the respective inserted coil conductor.

6. The contact device according to claim 1, wherein the feedthrough openings taper conically in a direction corresponding to a direction of insertion of a coil conductor into one of the feedthrough openings.

7. A stator of an electric machine having a contact device according to claim 1.

8. An electric machine having a stator according to claim 7.

9. The contact device according to claim 1, wherein the at least one elastic holding lug projects in a radial direction and inwardly toward a central axis of the respective feedthrough opening and into engagement with the inserted coil conductor.

10. The contact device according to claim 1, wherein the dimension of the cross-section at the narrow point of each of the feedthrough openings is the smallest cross-sectional dimension of the respective feedthrough opening.

11. The contact device according to claim 1, wherein the contact carrier comprises the upper side and a lower side facing away therefrom, the upper side including an upper surface and the lower side including a lower surface, the output-side end of each feedthrough opening upwardly through the upper surface of the upper side and extending between the upper surface and the lower surface of the lower side, and the narrow point of each of the feedthrough openings defines the output-side end of the corresponding feedthrough opening.

12. A contact device for a stator of an electric machine having a plurality of coil conductors each having a conductor contact surface, said contact device comprising:
a contact carrier comprising an electrically insulating material, an upper side positioned to face away from the stator in use and a lower side positioned to face the stator in use;
a plurality of electrically conductive connection conductors disposed on said upper side of said contact carrier, each said connection conductor having a connection contact surface;
a plurality of feedthrough openings disposed in said contact carrier, each said feedthrough opening having an output end opening through said upper side of said contact carrier; and
at least one holding lug disposed at said output end of each of said feedthrough openings and projecting towards a central axis of the respective feedthrough opening so as to define a narrowing at said output end thereof, said narrowing having a cross-sectional dimension, when viewed in a direction substantially perpendicular to the axis of the corresponding said feedthrough opening, less than a cross-sectional dimension of a part of said feedthrough opening disposed closer to said lower side of said contact carrier than said output end, said at least one holding lug comprising an elastically deformable material, said elastically-deformable material comprising a pre-tensioned configuration when a coil conductor of the stator is inserted through the respective said feedthrough opening, the conductor contact surface of the inserted coil conductor contacting said connection contact surface of an adjacent one of said connection conductors at said upper side of said contact carrier.

13. The contact device according to claim 12, wherein said pre-tensioned configuration of said elastically deformable material causes the inserted coil conductor to apply a permanent force to said adjacent connection conductor in a direction substantially perpendicular to an axis of the inserted coil conductor to press said connector contact surface and the conductor contact surface of the inserted coil conductor against one another.

14. The contact device according to claim 12, wherein said at least one holding lug projects in a radial direction and inwardly toward the axis of the respective feedthrough opening and into engagement with the inserted coil conductor.

15. The contact device according to claim 12, wherein the cross-sectional dimension of said narrowing of each of said feedthrough openings is the smallest cross-sectional dimension of the respective feedthrough opening.

16. The contact device according to claim 12, wherein each said feedthrough opening has an input end spaced axially from said output end and opening through said lower side of said contact carrier, and a tapered configuration extending between said input end and said output end, said tapered configuration having a smallest cross-sectional dimension at said output end and having cross-sectional dimensions which increase in a direction from said output end to said input end.

17. The contact device according to claim 12, wherein said at least one holding lug comprises a plurality of holding lugs disposed at said output end of each of said feedthrough openings and projecting radially towards the axis of the respective said feedthrough opening to prevent axial movement of the inserted coil conductor in at least one axial direction relative to said contact carrier.

18. The contact device according to claim 12, wherein the coil conductors of the stator are inserted through the respective said feedthrough openings in an insertion direction from said lower side of said contact carrier towards said upper side thereof, each said feedthrough opening tapering conically in the insertion direction and having a smallest cross-sectional dimension at said narrowing.

19. The contact device according to claim 12, wherein said upper side of said contact carrier includes an upper surface and said lower side includes a lower surface, said output end of each said feedthrough opening upwardly through said upper surface of said upper side and extending between said upper surface and said lower surface of said lower side, and said narrowing of each of said feedthrough openings defines said output end of the corresponding said feedthrough opening.

20. A stator for an electric machine, said stator comprising:
a plurality of coil conductors, each said coil conductor having a conductor contact surface;

a contact carrier comprising an electrically insulating material, an upper side and a lower side facing away from said upper side, said contact carrier comprising:
- a plurality of electrically conductive connection conductors disposed on said upper side of said contact carrier, each said connection conductor having a connection contact surface;
- a plurality of feedthrough openings disposed in said contact carrier, each said feedthrough opening having an output end opening through said upper side of said contact carrier and each said coil conductor extending through one of said feedthrough openings; and
- at least one holding lug disposed at said output end of each of said feedthrough openings and projecting towards a central axis of the respective said feedthrough opening so as to define a narrowing at said output end thereof, said narrowing having a cross-sectional dimension, when viewed in a direction substantially perpendicular to the axis of the corresponding said feedthrough opening, less than a cross-sectional dimension of a part of said feedthrough opening disposed closer to said lower side of said contact carrier than said output end, said at least one holding lug comprising an elastically deformable material, said elastically-deformable material being pre-tensioned when the corresponding said coil conductor is inserted through said feedthrough opening, each said coil conductor having a portion projecting outwardly from said output end of the corresponding said feedthrough opening, said portion including said conductor contact surface and each said conductor contact surface being disposed in contact with said connector contact surface of an adjacent one of said connection conductors.

* * * * *

UNITED STATES PATENT AND TRADEMARK OFFICE
CERTIFICATE OF CORRECTION

PATENT NO. : 11,539,259 B2
APPLICATION NO. : 17/147993
DATED : December 27, 2022
INVENTOR(S) : Nico Wieprecht It is certified that error appears in the above-identified patent and that said Letters Patent is hereby corrected as shown below:

In the Claims

Claim 4, Column 7, Line 11; change "according to claim 1" to --- according to claim 3 ---

Signed and Sealed this
Twenty-eighth Day of February, 2023

Katherine Kelly Vidal
*Director of the United States Patent and Trademark Office*